Patented Jan. 26, 1943

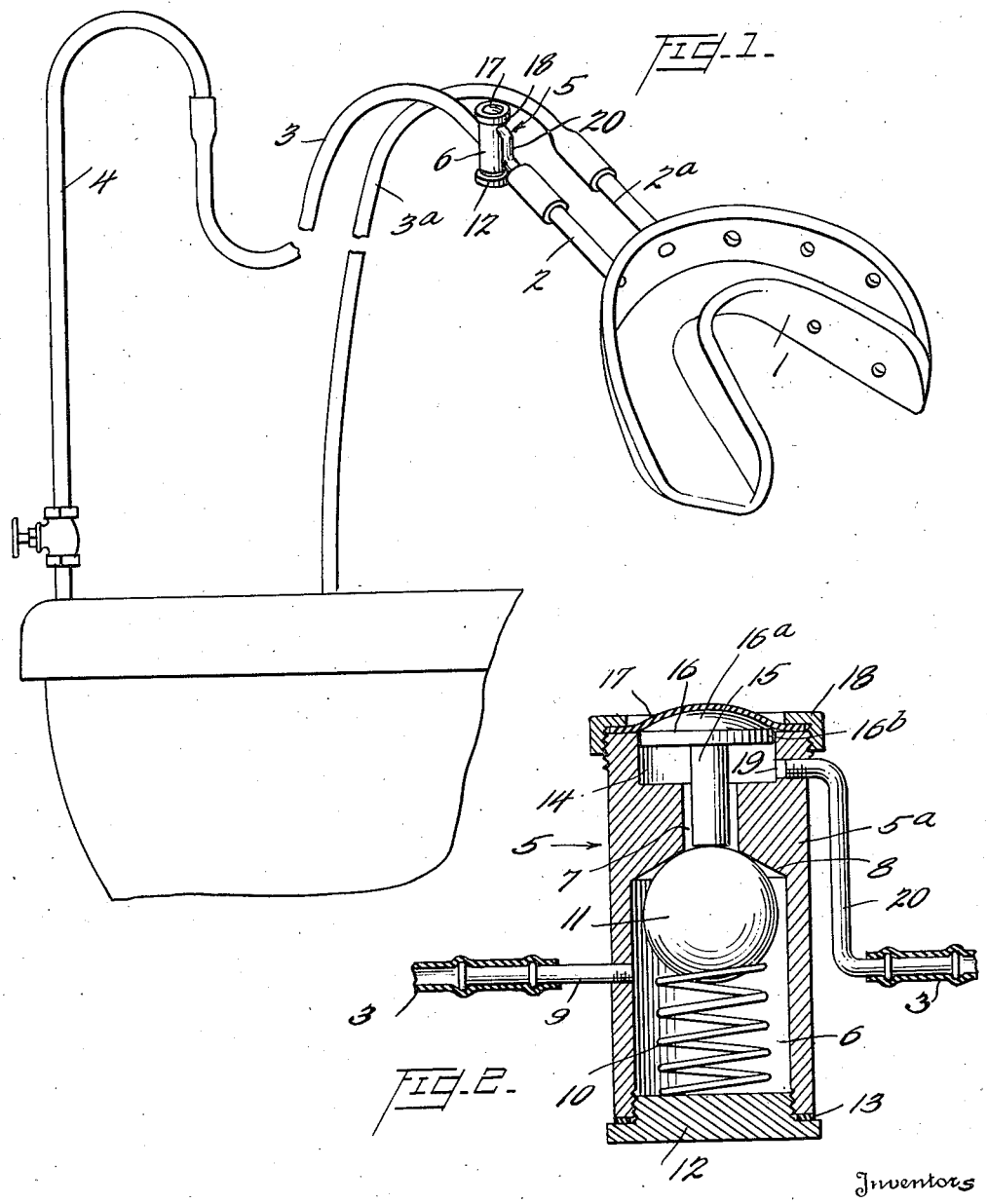

2,309,388

UNITED STATES PATENT OFFICE 2,309,388

VALVE FOR WATER-COOLED DENTAL TRAYS

Francis J. Gibbons, Scranton, Pa., and Alexander Gibbons and Margaret Rom, Brentwood, Md.

Application August 5, 1941, Serial No. 405,532

1 Claim. (Cl. 251—137)

This invention relates to water-cooled dental impression trays and has for its purpose to provide a manually controlled valve capable of being interposed in the water circulating system of such trays at a point conveniently accessible to the dentist for controlling the flow of water through such trays.

An important object of our invention is to provide a valve of the above character which is operable by simple finger pressure without requiring the dentist when using the tray for making a dental impression to shift his position, such as frequently causes jarring of the tray and results in distortion of the impression.

Another object of our invention is to provide a valve of the above character that may be sold as accessory equipment for dental trays and adapted to be readily inserted in circuit with the usual flexible hose which connects the tray with a dental fountain or other source of water supply.

Other objects and advantages will be apparent from the following detailed description of a preferred embodiment of the invention, reference being had to the annexed drawing in which:

Figure 1 is a view of a dental impression tray having a control valve connected in circuit therewith; and Figure 2 is a vertical cross-sectional view of the control valve.

In Fig. 1 is shown a water-cooled dental impression tray 1 of conventional construction having water inlet and outlet pipes 2 and 2a, respectively, projecting from the rear of the tray and providing connections for intake and offtake hose sections 3 and 3a respectively. The intake hose 3 is connected to the faucet 4 of the usual fountain located beside the patient's chair, while the offtake hose 3a empties into the bowl which is associated with the fountain.

Interposed in the intake hose section a short distance from the outlet pipe 2 is a control valve 5, more clearly shown in Fig. 2. This valve comprises a housing 5a of a generally cylindrical shape having a bore 6 of large diameter extending from its lower end upwardly and a bore 7 of smaller diameter extending from its upper end downwardly, these bores of different diameters being connected by a downwardly and outwardly sloping surface 8.

The bore 6 of larger diameter forms a valve chamber into which water flows through a metal tube 9 threaded into an opening in the wall of the chamber. A compressed coil spring 10 located within the chamber supports upon its upper end a ball 11 made, for example, of hard rubber or composition material, this ball normally being urged by the spring against the sloping surface 8 so as to close off communication between the bores 6 and 7. The lower end of the coil spring bears against a cap 12 threaded into the lower end of the bore 6 and closing this bore. A leather washer 13 is clamped between the lower edge of the valve housing 5a and the cap 12 to prevent leakage of water from the valve chamber.

The upper end of the valve housing is centrally cored out to provide a cylindrical shaped basin 14 of larger diameter than the bore 7 with which it is in communication. A pin 15 extends axially through the bore 7, its lower end resting upon the ball 11 and its upper end being provided with an enlarged head 16 having a convex upper surface 16a and a cylindrical circumferential edge 16b which forms a snug sliding fit with the inner circumference of the basin 14.

A rubber diaphragm 17 overlies the convex head of the pin, the edges of this diaphragm being tightly clamped into engagement with the upper edge of the valve housing by means of a flanged ring 18 threaded upon the outer circumference of the valve housing. The coil spring 10 exerts sufficient thrust to retain the pin 15 in elevated position with its head distending the rubber diaphragm into the position shown in Fig. 2; however, by exerting finger pressure against the diaphragm, the pin 15 depresses the ball 11 against the action of the spring to allow water to flow from the valve chamber through the bore 7 into the basin 14. The relative diameters of the bore 7 and the pin 15 are such as to afford adequate clearance for the flow of water between the valve chamber and the basin. The water flooding the basin escapes through a port 19 which is internally screw threaded so as to receive the threaded end of a piece of metal tubing 20 bent so as to lead downwardly along the outer circumference of the valve housing to about midway thereof and thence turning outwardly in extended line with the tube 9. The metal tubes 9 and 20 are adapted to be connected to the intake hose 3, it being only necessary to sever the hose and connect the severed ends to these tubes in order to assemble the valve in the water circulating system.

In operation, when a dental impression is to be made, the dentist fills the dental tray 1 with impression material and then connects the intake and offtake hose sections between the fountain and the tray as has already been mentioned. The tray is introduced into the patient's mouth and the dental impression made, thereupon the dentist exerts finger pressure against the diaphragm 17 to open the valve and allow water to flow through the valve and tray to accelerate the hardening of the impression material. The water flows into the valve chamber 6 through the metal tube 9, thence from the valve chamber upwardly through the bore 7 into the basin 14 and from this basin out through port 19 into the intake hose. After the water has flowed through the tray for a short time the dentist releases his finger from the diaphragm to allow the coil spring 10 to reseat the ball 11 over the lower end of the bore and close the valve.

By virtue of the valve construction and arrangement just described it is not necessary for the dentist to lean over to turn the water on and off at the fountain as heretofore has been the case, with consequent danger of mutilating the dental impression being taken, but he may employ both hands to hold the tray and by simple finger pressure may control the flow of water through the tray.

Obviously various changes in construction and design may be made in the valve for water-cooled dental trays described above without departing from the spirit of our invention as defined by the following claim.

We claim:

A valve for use with water-cooled dental trays of the type having a flexible intake hose adapted to be connected to a source of water supply, said valve being of cylindrical shape throughout its length and having a cylindrical bore in its lower end to form a valve housing, a cylindrical bore in its upper end to form a basin and a central intermediate bore connecting the upper and lower bores, said intermediate bore being of substantially smaller diameter than the upper and lower bores, a screw-threaded plug closing the bottom of the valve housing, an inlet port provided in the circumferential wall of the valve housing, an outlet port provided in the circumferential wall of the basin, metal tubes secured within said ports and adapted to be detachably connected with the flexible intake hose, the tube connected with the outlet port being bent to extend in approximate alignment with the inlet port so as to prevent tipping of the valve when freely supported by the hose, a coil spring in the valve chamber bearing at one end against said plug, a ball supported by the other end of said spring and normally closing the lower end of the intermediate bore, a pin extending through the intermediate bore and footing upon said ball, said pin being of substantially less diameter than the intermediate bore, a cylindrical head rigidly and non-detachably secured to the upper end of said pin, said head being of substantially the same diameter as the basin so as to be slidable therein, a resilient diaphragm closing the top of the basin and overlying the entire upper surface of the head of the pin, and a ring externally threaded upon the upper end of the valve and having an inwardly directed flange for clamping the diaphragm to the upper edge of the valve, said valve being so constructed and arranged that downward pressure upon the diaphragm causes said pin to depress the ball to establish communication through the valve between the inlet and outlet ports.

FRANCIS J. GIBBONS.
ALEXANDER GIBBONS.
MARGARET ROM.